United States Patent [19]
Bogar et al.

[11] 4,174,140
[45] Nov. 13, 1979

[54] RESILIENT CENTER PLANE ASSEMBLY

[75] Inventors: William H. Bogar, Newark; Howard D. Irwin, Wilmington, both of Del.

[73] Assignee: E. I. Du Pont de Nemours and Company, Wilmington, Del.

[21] Appl. No.: 832,974

[22] Filed: Sep. 13, 1977

[51] Int. Cl.² .......................... B61F 5/16; F16C 17/04; F16C 27/08; F16F 1/44

[52] U.S. Cl. .................................. 308/137; 105/189; 105/199 C

[58] Field of Search ........................ 105/199 C, 189; 308/137

[56] References Cited

U.S. PATENT DOCUMENTS

| 2,258,640 | 10/1941 | Beckette | 308/137 |
|---|---|---|---|
| 2,509,955 | 5/1950 | Barnes | 308/137 X |
| 2,514,034 | 7/1950 | Dean | 105/199 C |
| 2,655,117 | 10/1953 | Travilla | 105/199 C |
| 3,399,006 | 8/1968 | Reece et al. | 308/137 |
| 3,405,654 | 10/1968 | Dilg | 308/137 X |
| 3,762,694 | 10/1973 | MacDonnell | 105/197 A X |
| 3,986,752 | 10/1976 | Bogar et al. | 105/199 C |

*Primary Examiner*—Trygve M. Blix
*Assistant Examiner*—Howard Beltran

[57] ABSTRACT

In railway car center plate swivel connections, horizontal and vertical loads are distributed more evenly along the bearing surfaces when the body center plate assembly includes an annular, elastomeric pad having horizontal and vertical bearing surfaces, in which the elastomeric pad has a centrally disposed opening, is positioned concentrically around and adjacent to a partial center plate which fills the centrally disposed opening.

12 Claims, 3 Drawing Figures

RESILIENT CENTER PLANE ASSEMBLY

BACKGROUND OF THE INVENTION (1) Field of the Invention

This invention relates to railway car center plate swivel connections and, more particularly, to railway car body center plate assemblies in which the bearing plate is an elastomeric pad having horizontal and vertical bearing surfaces.

(2) Description of the Invention

The swivel connection of railway vehicles comprises a center plate assembly disposed between the car body or frame and the truck, which allows the truck to turn under the car about a center pin. The center plate assembly conventionally used in railway cars comprises a body center plate attached to the underside of the body bolster and a truck center plate having the shape of a bowl and being secured to the top side of the truck bolster or cast integrally therewith. The body and truck center plates are provided with coaxial openings which receive a center pin therein to guide the engagement of the parts.

Under conditions in which railway cars are operated, breakage of the center plate assembly occurs much too frequently, especially in the larger cars currently coming into broad usage. During normal operation of railway freight cars, the body center plate is the structural member which, together with the side bearings, transfers the railway car load onto the truck. When in motion, the railway car rocks from side to side. When the car rocks to one side, the weight of the car is concentrated at a single line of contact near the peripheral edge of the horizontal bearing surface of the body center plate. This concentration of the car load at a single line of contact on the body center plate, plus the fact that it is intermittently applied and released, in many cases results in fatigue cracking of the center plate. Failure of the body center plate, or the means of its attachment, causes loss of car operating time while the center plate is being replaced or repaired.

Accordingly, there is a need for a railway car center plate assembly in which high-bearing stresses between the body center plate and truck center plate, induced by the car rocking back and forth on the edges of the body center plate as it bears on one side bearing and then the other, are eliminated, thus assuring a longer useful life for the body center plate. Further, there is a need for a center plate assembly that provides sufficient resistance to rotation of the truck to reduce the tendency of the truck to oscillate about the center plate, a condition known as "hunting".

An improved body center plate assembly design in which the horizontal bearing surface is an elastomeric pad is described in U.S Pat. No. 3,986,752. The body center plate assembly comprises.

(1) a base plate having a flat surface on its underside and a circular, central opening adapted for receiving a center pin;

(2) two concentric, cylindrical flanges extending downward from and perpendicular to the flat surface of the base plate encircling the central opening; and (3) an annular, solid, synthetic elastomeric pad having horizontal bearing surfaces which is in contact with the flat surface on the underside of the base plate and is located within and substantially fills the annular space between the flanges of the body center plate. This body center plate represents a major advance, in that it distributes the load more evenly along the horizontal bearing surface. This assembly, however, does nothing to more evenly distribute the stress of horizontal forces between the body center plate annular flange and the sides of the truck center plate bowl encountered during braking and acceleration.

SUMMARY OF THE INVENTION

This invention provides a railway car body center plate assembly in which the bearing plate is an elastomeric pad having both horizontal and vertical bearing surfaces whereby both horizontal and vertical loads are distributed more evenly along the bearing surfaces. The body center plate assembly of this invention comprises (a) a metal base plate having a flat surface on its underside, and a centrally disposed, circular, vertical hole adapted for receiving a center pin;

(b) a circular, metal, partial center plate having a bottom, horizontal bearing surface, said partial center plate extending downward from the flat surface on the underside of the base plate adjacent to and encircling the centrally disposed hole, and having a diameter which is at least about twice and not more than about 8 times the diameter of the centrally disposed hole; and (c) a single, annular, solid, synthetic elastomeric pad having a centrally disposed, circular, vertical opening and horizontal and vertical bearing surfaces, said elastomeric pad being positioned concentrically around and adjacent to the partial center plate in contact with the flat surface on the underside of the base plate, having a diameter which is about 1.25 to about 3 times the diameter of the centrally disposed opening, and having a vertical, elastic deflection of about 0.05 to about 0.15 inch which does not exceed about 15% of the thickness of the elastomeric pad under the maximum use load for the center plate assembly, and a shore A hardness of at least about 40.

Preferably, the bottom, horizontal bearing surface of the elastomeric pad is lower than the bottom, horizontal bearing surface of the partial center plate and the elastomeric pad is polyurethane. The center plate assembly of this invention normally permits the truck to rotate through the small angles required to negotiate mainline curves by shear stressing of the elastomeric pad without accompanying slippage at the bearing surfaces. In negotiating the sharper curves in railroad yards, it is often necessary that some of the truck rotation occur by slippage at the bearing surfaces.

DETAILED DESCRIPTION OF THE INVENTION

Figure 1:
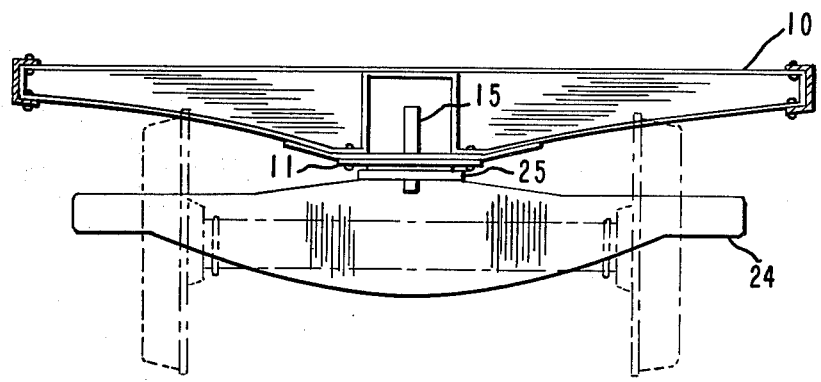
FIG. 1 is a front elevation view of the swivel connection of a railway car showing a body bolster and a truck bolster with the center plate assembly therebetween.

Referring to FIG. 1, the center plate assembly of the railway car swivel connection comprises a body center plate assembly 11 attached to a body bolster 10, a bowl-shaped truck center plate 25 attached to a truck bolster 24, and a center pin 15 which facilitates engagement of the parts.

Figure 2:
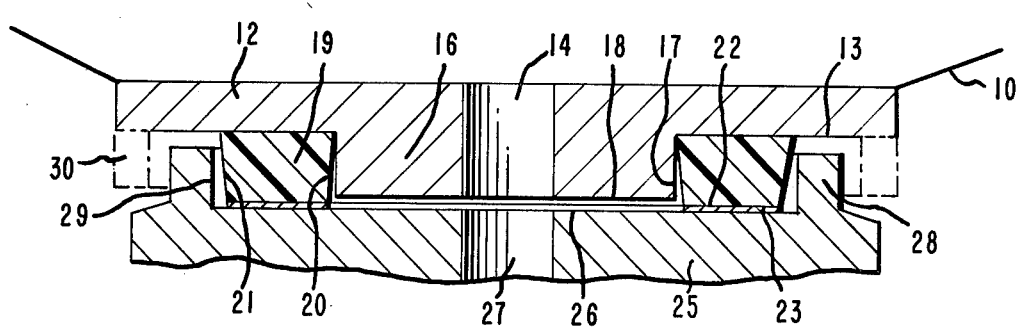
FIG. 2 is a vertical sectional view showing, in enlargement, the assembly of the body and truck center plates in detail.
Figure 3:
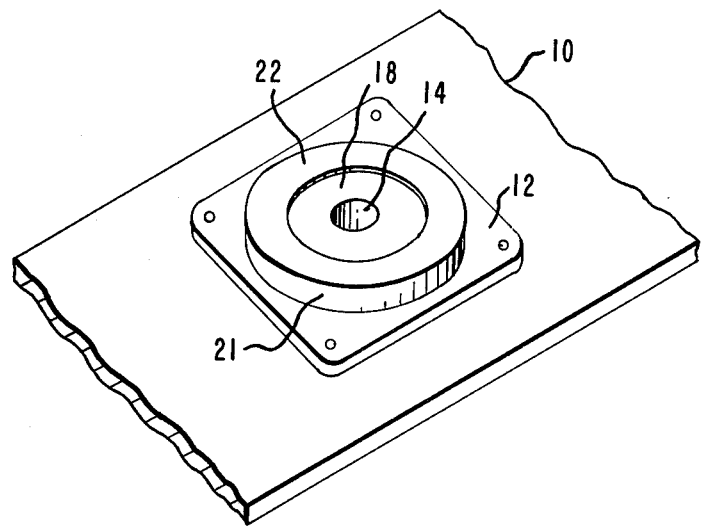
FIG. 3 is an inverted perspective view of a portion of a body bolster and body center plate assembly.

Referring to FIG. 2, body center plate assembly 11 comprises a metal base plate 12 having a flat surface 13 on its underside and a centrally disposed, circular, vertical hole 14 adapted for receiving center pin 15. A circular, metal, partial center plate 16 having a vertical bearing surface 17 and a bottom, horizontal bearing surface 18 extends downward from flat surface 13 on the underside of base plate 12 and is positioned adjacent to and encircling hole 14. Preferably, partial center plate 16 is cast integrally with base plate 12. The diameter of partial center plate 16 should be substantial, for example, at least about twice, and not more than about 8 times, the diameter of hole 14. Preferably, the diameter of the partial center plate is at least about 3 times, and not more than about 5 times, the diameter of the hole.

An annular, solid, synthetic elastomeric pad 19 having a centrally disposed, circular, vertical opening defined by an inner, vertical bearing surface 20 is positioned concentrically around and adjacent to partial center plate 16 in contact with flat surface 13 on the underside of base plate 12. Inner bearing surface 20 is slightly tapered to permit adequate deflection under vertical load. When the center plate assembly is under load, inner, vertical bearing surface 20 of the elastomeric pad is in contact with outer, vertical bearing surface 17 of partial center plate 16. The elastomeric pad also has an outer, vertical bearing surface 21, and a bottom, horizontal bearing surface 22 which is lower than bottom, horizontal bearing surface 18 of partial center plate 16.

The area of bottom, horizontal bearing surface 22 of the elastomeric pad should be large enough to minimize bearing pressure and to distribute the vertical load. Generally, the elastomeric pad has a diameter which is substantial, for example, about 1.25 to about 3 times the diameter of its centrally disposed opening, and preferably about 1.5 to about 2 times. Preferably, the radial width of the bottom, horizontal bearing surface of the elastomeric pad is greater than its thickness.

Optionally, the elastomeric pad may be provided with a layer of metal on one, or both, of the horizontal bearing surfaces. A thin plate of metal, preferably steel, is useful because it provides a lower friction bearing surface. Preferably the metal bearing plate is on the bottom, horizontal bearing surface of the elastomeric pad as illustrated by bearing plate 23 in the drawing. In that case, the bottom, horizontal bearing surface of the bearing plate is lower than the bottom, horizontal bearing surface of the partial center plate.

Each of the trucks of the railway car has a truck bolster 24 lying beneath body bolster 10 and is provided on its top side with a bowl-shaped truck center plate 25 having an upwardly-presented, flat, horizontal, load-bearing surface 26. The truck center plate has a centrally disposed, circular, vertical hole 27 of the same diameter as centrally disposed hole 14 of body center plate assembly 11 and adapted to receive center pin 15. The vertical sidewall of the bowl-shaped truck center plate is in the form of an upstanding annular flange 28 which is concentric with centrally disposed hole 27 and has an inner, vertical bearing surface 29. In operation, a portion of outer, vertical bearing surface 21 of the elastomeric pad will contact a portion of inner vertical bearing surface 29 of flange 28 of the truck center plate, thus transmitting to and from the truck horizontal forces resulting from braking and acceleration.

Truck center plate 25, cast integrally with truck bolster 24, is the conventional design used in most railway vehicles. Consequently, it is possible to convert conventional swivel connections to the improved assembly described herein merely by replacing the conventional body center plate with the novel body center plate assembly of the present invention.

The essential novelty of the body center plate assembly of this invention is that it is provided with an elastomeric pad having both horizontal and vertical bearing surfaces. This elastomeric pad transmits all the weight from the body center plate assembly to the truck center plate and distributes this vertical load more evenly over the horizontal bearing surfaces, while it also transmits all the horizontal forces between partial center plate 16 and truck annular flange 28 and distributes this horizontal load more evenly over the vertical bearing surfaces.

The elastomeric pad may be made of any suitable synthetic elastomer which is tough, flexible and stretchable and has good load bearing and wear resistance characteristics. The elastomeric pad should have a vertical, elastic deflection of about 0.05 to about 0.15 inch under the maximum use load for the center plate assembly; that is, the load limit for which the center plate assembly was designed. The thickness of the elastomeric pad should be such that this deflection does not exceed about 15% of the thickness of the pad. The hardness of the pad should be at least about 40 shore A, as measured by ASTM Method D-2240. The elastomer preferably has a hardness of at least about 80 shore A.

Preferably, the elastomer is a hard polyurethane comprising the reaction product of an organic polyisocyanate, preferably an aromatic polyisocyanate, a polyester polyol or a polyalkyleneether polyol having a molecular weight between about 400 and 3000, and a glycol or an organic polyamine having a molecular weight below about 350. "Adiprene" L-200 urethane rubber (E. I. du Pont de Nemours and Company) cured with methylene-bis-orthochloroaniline to give a polyurethane having a hardness of about 58-62 durometer D, as measured by ASTM Method D-2240, is especially preferred. Other suitable synthetic elastomeric materials which have good load bearing qualities include polychloroprene, ethylene/propylene copolymers having one or more nonconjugated dienes, chlorosulfonated polyethylene, styrene-butadiene rubber, and copolymers of butadiene and acrylonitrile.

The center plate assembly of the present invention provides better distribution of vertical and horizontal stress at the bearing surfaces and substantially reduces the incidence or structural damage to the body center plate and other structural members to which it is attached. When the full weight of the railway car bears on the center plate assembly, it is imperative, for the benefits of this invention to be realized, that the thickness and modulus of the elastomeric pad be such that its compression under the full weight of the car is insufficient to cause partial center plate 16 to contact bearing surface 26 of the truck center plate or to cause annular flange 28 of the truck center plate to contact flat surface 13 of the body center plate assembly. Otherwise, metal-to-metal contact will cause the undesirable concentration of stress encountered in conventional bearing arrangements.

A built-in safety advantage of the present invention, however, is the fact that contact of partial center plate 16 with bearing surface 26 of the truck center plate provides a temporary backup bearing system for vertical loads in the event that the elastomeric pad fails in use. This backup system would permit the railway car to be operated until a new elastomeric pad could be put in place.

Optionally, an additional annular flange 30, extending downward from and perpendicular to flat surface 13 of the body center plate assembly, concentric with and having a larger annular diameter than partial center plate 16, and adapted to fit outside of annular flange 28 of the truck center plate, could be provided as a temporary backup system for transmitting horizontal forces in the event that the elastomeric pad fails in use. This additional flange would be spaced far enough away from flange 28 that it would be nonfunctional under normal circumstances. In this case, it may also be desirable to machine the outer surface of annular flange 28 to provide a bearing surface for contact with annular flange 30.

Optionally, the elastomeric pad can have bonded to either, or both, its upper and/or lower surfaces an annular metal plate, such as bearing plate 23. In the situation where the lower surface only of the elastomeric pad is bonded to a thin metal plate, the upper free surface may be bonded to flat surface 13 of the body center plate assembly. Bonding is accomplished by using a suitable adhesive. An advantage of bonding the elastomeric pad to the body center plate assembly in this fashion is that it facilitates assembly of the body center plate assembly on the truck center plate, and assures that, if horizontal movement occurs between the elastomeric pad and the mating flat surfaces, it is confined to the bottom surface of the pad and the flat bearing surface of the truck center plate.

As an alternate back up for handling horizontal forces, the steel plate bonded to the lower surface of the elastomeric pad could be made thick enough that, in the event of failure of the elastomeric pad, the steel plate would itself transmit horizontal forces from truck annular flange 30 to partial center plate 16. In other words, the top surface of steel plate 23 would be significantly above the bottom surface of partial center plate 16. In this case, the elastomeric pad will still transmit the vertical load, even though the bottom, horizontal bearing surface of the elastomeric pad is not lower than the horizontal bearing surface of partial center plate 16.

We claim:

1. A railway car body center plate assembly which comprises:
   (a) a metal base plate having a flat surface on its underside, and a centrally disposed, circular, vertical hole adapted for receiving a king pin;
   (b) a circular, metal, partial center plate integral with the base plate and having a flat, bottom, horizontal surface, said partial center plate extending downward from the flat surface on the underside of the base plate adjacent to and encircling the centrally disposed hole, and having a substantial diameter; and
   (c) a single, annular, homogeneous, solid, synthetic elastomeric pad having a centrally disposed, circular, vertical opening and horizontal and vertical bearing surfaces, said elastomeric pad being positioned concentrically around and adjacent to the partial center plate in contact with the flat surface on the underside of the base plate, having a substantial diameter adapted to substantially fill the space between the partial center plate and a truck center plate flange with sufficient clearance that, under vertical load, the elastomeric pad contacts the vertical surfaces of less than both of the partial center plate and the truck center plate flange, and having a thickness adapted such that the bottom of the horizontal bearing surface, under load, is lower than the bottom edge of the partial center plate and the elastomeric pad substantially vertically overlaps the truck center plate flange, whereby said elastomeric pad is adapted to transmit all the weight from the body center plate assembly to the truck center plate and to transmit all horizontal forces between the partial center plate and the truck center plate flange.

2. The body center plate assembly of claim 1 wherein the elastomeric pad, under vertical load, contacts the vertical surface of one of the partial center plate and the truck center plate flange.

3. The body center plate assembly of claim 1 wherein the bottom, horizontal bearing surface of the elastomeric pad is lower than the bottom bearing surface of the partial center plate.

4. The body center plate assembly of claim 3 wherein the elastomeric pad is polyurethane.

5. The body center plate assembly of claim 3 wherein the elastomeric pad is adhesively bonded to the flat surface on the underside of the base plate.

6. The body center plate assembly of claim 3 wherein the elastomeric pad is provided with a thin, metal, bearing plate on its bottom, horizontal bearing surface.

7. The railway car center plate swivel connection of claim 3 wherein the elastomeric pad is polyurethane.

8. The railway car center plate swivel connection of claim 3 wherein the elastomeric pad is adhesively bonded to the flat surface on the underside of the base plate of the body center plate assembly.

9. The railway car center plate swivel connection of claim 3 wherein the elastomeric pad is provided with a thin, metal, bearing plate on its bottom, horizontal bearing surface.

10. In a railway car center plate swivel connection having
    (a) a body center plate assembly rotatably mounted on
    (b) a truck center plate having a centrally disposed, circular, vertical hole adapted for receiving a king pin, and an upstanding annular flange concentric with the centrally disposed hole and surrounding an upwardly-presented, flat, horizontal bearing surface, the improvement in which said body center plate assembly comprises:
    (1) a metal base plate having a flat surface on its underside and a centrally disposed, circular, vertical hole adapted for receiving a king pin;
    (2) a circular, metal, partial center plate integral with the base plate and having a flat, bottom, horizontal surface, said partial center plate extending downward from the flat surface on the underside of the base plate adjacent to and encircling the centrally disposed hole, and having a substantial diameter; and
    (3) a single, annular, homogeneous, solid, synthetic elastomeric pad having a centrally disposed, circular, vertical opening and horizontal and vertical bearing surfaces, said elastomeric pad being positioned concentrically around and adjacent to the partial center plate in contact with the flat surface on the underside of the base plate, having a substantial diameter adapted to substantially fill the space between the partial center plate and a truck center plate flange with sufficient clearance that, under vertical load, the elastomeric pad contacts the vertical surfaces of less than both of the partial center plate and the truck center plate flange, and having a thickness adapted such that the bottom of the horizontal bearing surface, under load, is lower than the bottom edge of the partial center plate and the elastomeric pad substantially vertically overlaps the truck center plate flange, whereby said elastomeric pad transmits all the weight from the body center plate assembly to the truck center plate and transmits all the horizontal forces between the partial center plate and the truck center plate flange.

11. The railway car center plate swivel connection of claim 10 wherein the elastomeric pad, under vertical load, contacts the vertical surface of one of the partial center plate and the truck center plate flange.

12. The railway car center plate swivel connection of claim 10 wherein the bottom, horizontal bearing surface of the elastomeric pad is lower than the bottom, horizontal bearing surface of the partial center plate.

* * * * *